US012368259B2

(12) United States Patent
Hashiguchi

(10) Patent No.: US 12,368,259 B2
(45) Date of Patent: Jul. 22, 2025

(54) CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 427 days.

(21) Appl. No.: 18/084,268

(22) Filed: Dec. 19, 2022

(65) Prior Publication Data

US 2023/0238727 A1 Jul. 27, 2023

(30) Foreign Application Priority Data

Jan. 24, 2022 (JP) ................................. 2022-008431

(51) Int. Cl.
*H01R 13/24* (2006.01)
*H01R 12/71* (2011.01)
*H01R 13/40* (2006.01)

(52) U.S. Cl.
CPC ....... *H01R 13/2407* (2013.01); *H01R 12/714* (2013.01); *H01R 12/716* (2013.01); *H01R 13/40* (2013.01)

(58) Field of Classification Search
CPC ......................... H01R 13/2407; H01R 12/714; H01R 12/716; H01R 13/40; H01R 13/26; H01R 13/62; H01R 24/00
See application file for complete search history.

(56) References Cited

U.S. PATENT DOCUMENTS

| | | | | |
|---|---|---|---|---|
| 7,614,883 | B2 * | 11/2009 | Mendenhall | H01R 12/714 439/71 |
| 9,680,267 | B2 * | 6/2017 | Hashiguchi | H01R 24/84 |
| 10,797,422 | B2 * | 10/2020 | Obata | H01R 12/716 |
| 2017/0214184 | A1 | 7/2017 | Takai et al. | |

FOREIGN PATENT DOCUMENTS

| | | | |
|---|---|---|---|
| JP | H06208876 | A | 7/1994 |
| JP | 2004207165 | A | 7/2004 |
| JP | 2009021206 | A | 1/2009 |
| JP | 2017092020 | A | 5/2017 |
| JP | 2017130421 | A | 7/2017 |
| JP | 2018107152 | A | 7/2018 |
| JP | 2019125478 | A | 7/2019 |

* cited by examiner

*Primary Examiner* — Edwin A. Leon
(74) *Attorney, Agent, or Firm* — Holtz, Holtz & Volek PC

(57) ABSTRACT

A terminal of a connector has a receiving portion, a first supporting portion which is resiliently deformable and extends from the receiving portion, a contact portion supported by the first supporting portion, a second supporting portion extending from the contact portion and an abutment portion supported by the second supporting portion. In a connection process of the connector and a mating connector, the abutment portion of the terminal begins to be brought into contact with the receiving portion at a first position on the receiving portion, and it is slid on the receiving portion until the abutment portion reaches a second position. The contact portion is brought into contact with a mating terminal when the connector is connected to the mating connector.

5 Claims, 10 Drawing Sheets

CONNECTOR

CROSS REFERENCE TO RELATED APPLICATIONS

This application is based on and claims priority under 35 U.S.C. § 119 to Japanese Patent Application No. JP2022-008431 filed Jan. 24, 2022, the contents of which are incorporated herein in their entirety by reference.

BACKGROUND OF THE INVENTION

This invention relates to a connector, particularly, to a connector provided with a terminal which has a spring portion supporting a contact portion.

There is known a connector provided with a terminal in which a spring portion supporting a contact portion thereof has excellent spring properties and which can suppress deterioration of high-frequency transmission characteristics. For example, a connector of this type is disclosed in JP 2017-92020 A (Patent Document 1).

Referring to FIGS. 14 and 15, a terminal 90 of a connector disclosed in Patent Document 1 has a connector contact portion 901, a press-fit fixing portion 903, a spring portion 905, a substrate connection portion (contact point) 907 and a loop contact portion 90.

As shown in FIGS. 14 and 15, the spring portion 905 supports the substrate connection portion 907. The spring portion 905 is resiliently deformable. Owing to resilient deformation of the spring portion 905, the substrate connection portion 907 is movable in an up-down direction and in a lateral direction perpendicular to the up-down direction. The spring portion 905 has excellent spring properties because of employing a U-shape as a shape thereof.

As understood from FIGS. 14 and 15, during a process in which a connector (not shown) is connected to a module substrate (not shown), the substrate connection portion 907 of the terminal 90 is pressed onto and slid on a pad (not shown) of the module substrate by a reaction force of the spring portion 905. Accordingly, even if a natural oxide film is formed on a surface of each of the substrate connection portion 907 and the pad, the natural oxide film is broken, so that the substrate connection portion 907 and the pad are electrically connected to each other.

As understood from FIGS. 14 and 15, in the process in which the connector (not shown) and the module substrate (not shown) are connected to each other, the loop contact portion 909 of the terminal 90 is brought into contact with a part of the terminal 90 between the spring portion 905 and the press-fit fixing portion 903. Accordingly, a transmission distance from the connector contact portion 901 to the substrate connection portion 907 can be shortened in comparison with that in a case of a route via the spring portion 905. As a result, high-frequency transmission characteristics of the terminal 90 are improved in comparison with that in the case of the route via the spring portion 905.

When the connector of Patent Document 1 is connected to the module substrate (mating connector), the substrate connection portion (contact point) 907 might not be slid on the pad owing to friction between the substrate connection portion 907 and the pad. Accordingly, the connector of Patent Document 1 has a problem of inferior contact reliability.

SUMMARY OF THE INVENTION

It is an object of the present invention to provide a connector which can certainly slide a contact portion thereof when the connector is connected to a mating connector and which can improve contact reliability.

As understood from FIGS. 14 and 15, in the terminal 90 of the connector of Patent Document 1, the loop contact portion 909 is brought into contact with a bent portion located between the spring portion 905 and the press-fit fixing portion 903 at a beginning of connection of the connector to the module substrate (mating connector: not shown). Then, as the loop contact portion 909 is moved along the bent portion, the substrate connection portion (contact point) 907 is moved on the pad (not shown) in the lateral direction. When the loop contact portion 909 reaches a straight-line portion located just below the press-fit fixing portion 903, the substrate connection portion (contact point) 907 is not moved on the pad in the lateral direction. Accordingly, the connector of Patent Document 1 has a possibility that the substrate connection portion (contact portion) 907 cannot wipe off (or be slid on) the pad (mating contact portion) when the connector is connected to the module substrate (mating connector).

The present invention provides, in consideration of the aforementioned points, a connector which can certainly slide a contact portion thereof when the connector is connected to a mating connector and which can improve contact reliability.

One aspect of the present invention provides a connector which is connectable to a mating connector along an up-down direction. The connector comprises a terminal. The mating connector comprises a mating terminal. The terminal has a receiving portion, a first supporting portion which is resiliently deformable and extends from the receiving portion, a contact portion supported by the first supporting portion, a second supporting portion which extends from the contact portion and an abutment portion supported by the second supporting portion. The contact portion is brought into contact with the mating terminal when the connector is connected to the mating connector. In a connection process of the connector and the mating connector, the abutment portion begins to be brought into contact with the receiving portion at a first position on the receiving portion and then is slid on the receiving portion until connection of the connector and the mating connector is completed and the abutment portion reaches a second position on the receiving portion. The second position is farther from the contact portion than the first position is in the up-down direction and farther from the first supporting portion than the first position is in a lateral direction perpendicular to the up-down direction. The receiving portion intersects with the up-down direction and the lateral direction at least at the second position.

In the connection process of the connector and the mating connector, the abutment portion is slid on the receiving portion from the first position to the second position. Particularly, even when the abutment portion is slid on the receiving portion in a vicinity of the second position, the contact portion keeps on being moved in the lateral direction because the receiving portion intersects with the up-down direction and the lateral direction at least at the second position. Thus, the connector of the present invention can certainly slide the contact portion on the mating contact portion and can obtain high connection reliability.

An appreciation of the objectives of the present invention and a more complete understanding of its structure may be had by studying the following description of the preferred embodiment and by referring to the accompanying drawings.

Figure 1:
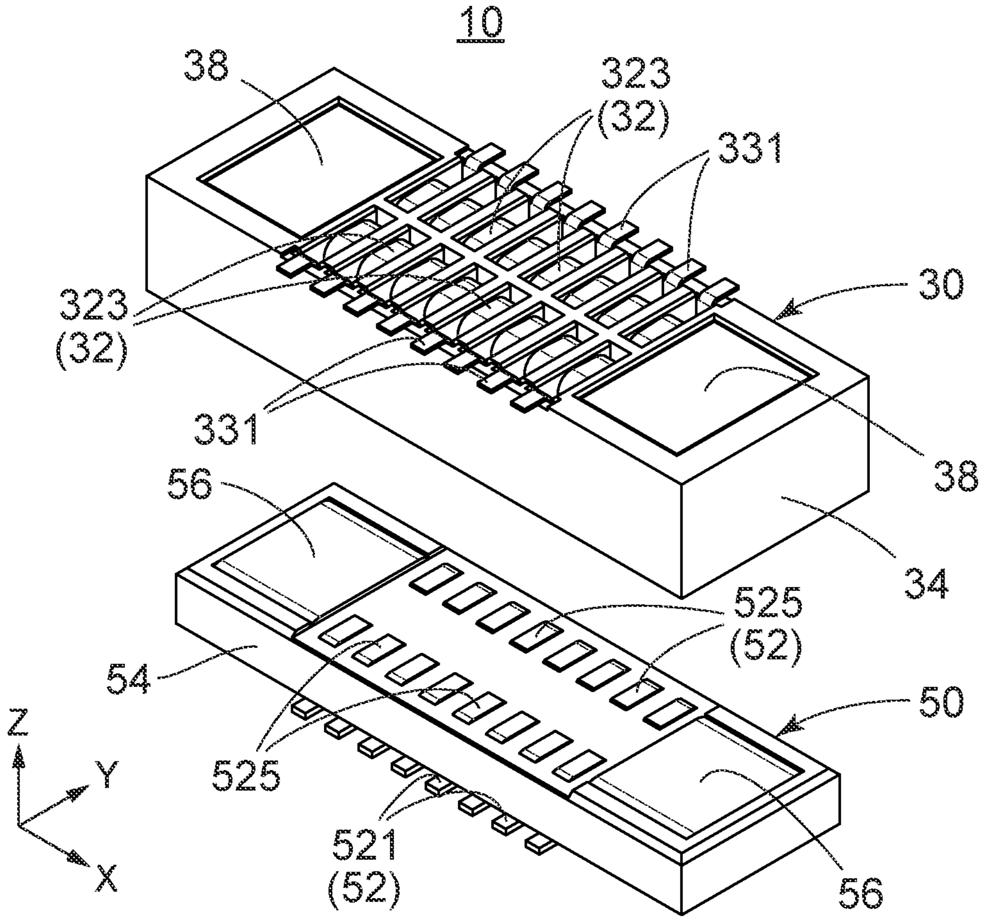
FIG. 1 is a top, perspective view showing a connector assembly having a connector according to a first embodiment of the present invention. The connector and a mating connector are not mated with each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 2:
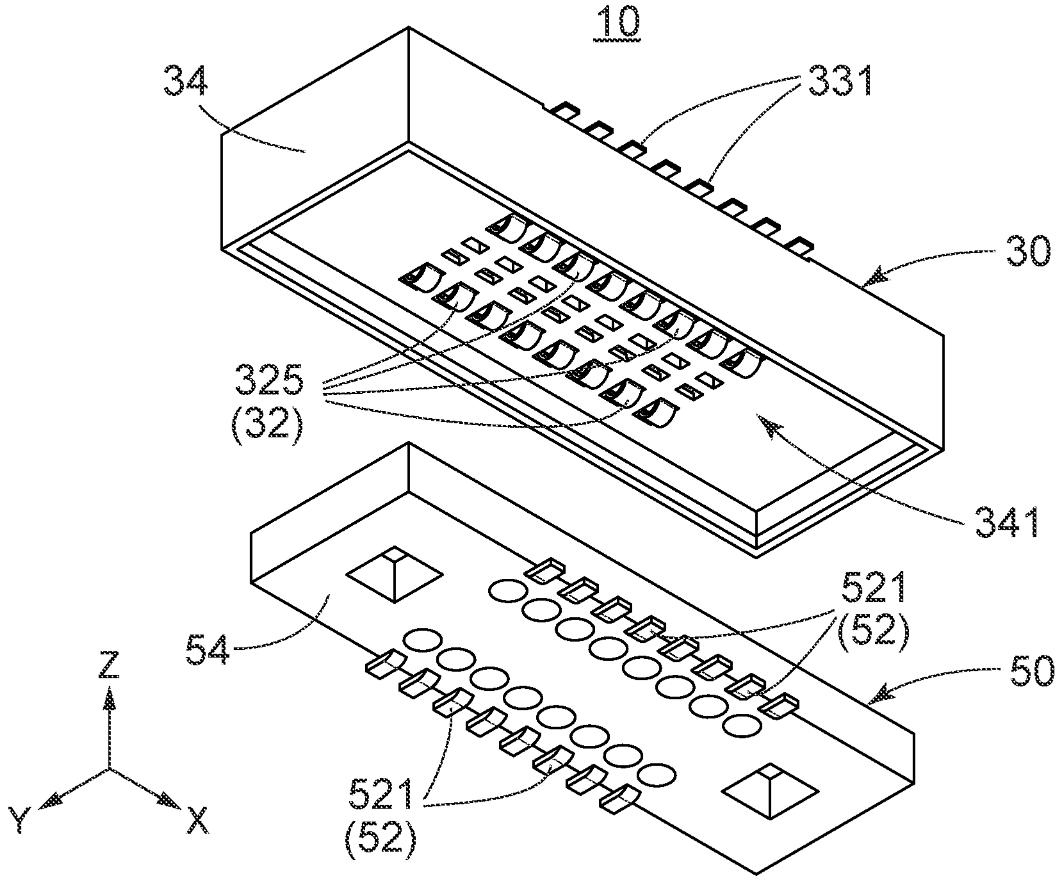
FIG. 2 is a bottom, perspective view showing the connector assembly of FIG. 1.

Referring to FIGS. 1 and 2, a connector 30 according to a first embodiment of the present invention forms a connector assembly 10 together with a mating connector 50. When used, the connector 30 and the mating connector 50 are mounted on a circuit board (not shown) and a mating circuit board (not shown), respectively, for example.

Figure 3:
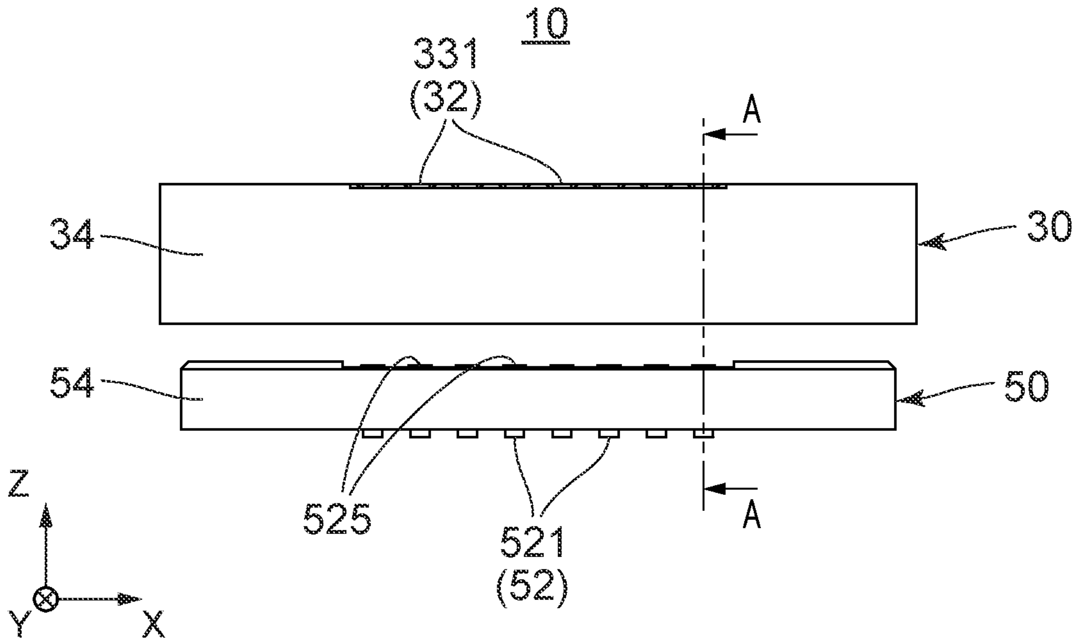
FIG. 3 is a side view showing the connector assembly of FIG. 1.
Figure 4:
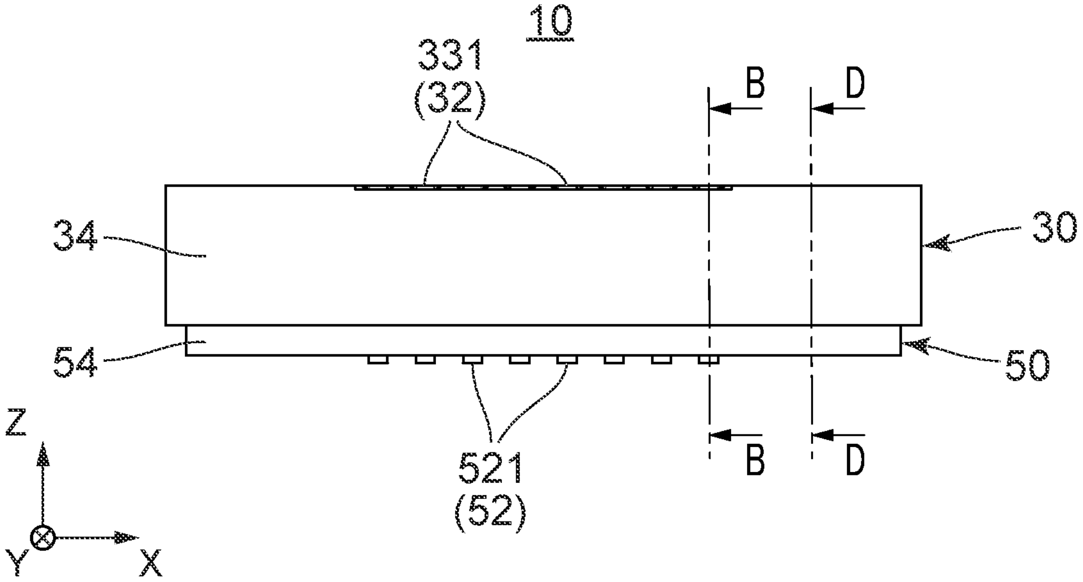
FIG. 4 is another side view showing the connector assembly of FIG. 1. The connector and the mating connector are mated with each other.

As understood from FIGS. 3 and 4, the connector 30 is connectable to the mating connector 50 along an up-down direction. In the present embodiment, the up-down direction is a Z-direction. A positive Z-direction is directed upward while a negative Z-direction is directed downward.

As shown in FIGS. 1 and 2, the connector 30 is provided with a plurality of terminals 32 and a housing (holding member) 34. The mating connector 50 is provided with a plurality of mating terminals 52 and a mating housing 54. The mating terminals 52 correspond to the terminals 32 of the connector 30, respectively. However, the present invention is not limited thereto. The connector 30 should be provided with at least one terminal 32. Moreover, the housing 34 is not essential. Similarly, the mating connector 50 should be provided with at least one mating terminal 52. Moreover, the mating housing 54 is not essential.

Figure 7:
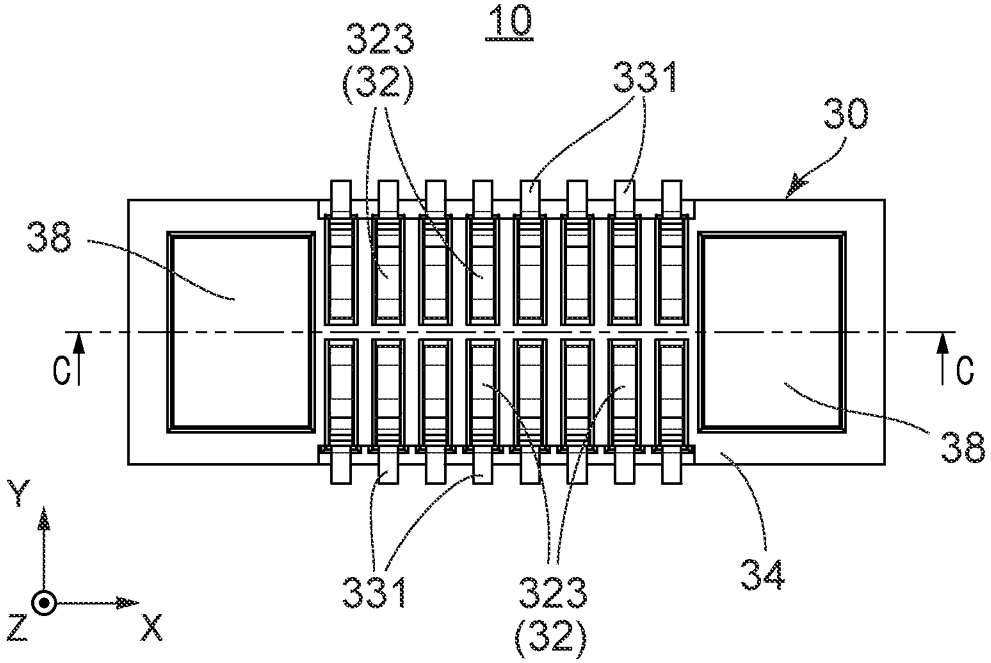
FIG. 7 is a plan view showing the connector assembly of FIG. 4.
Figure 8:
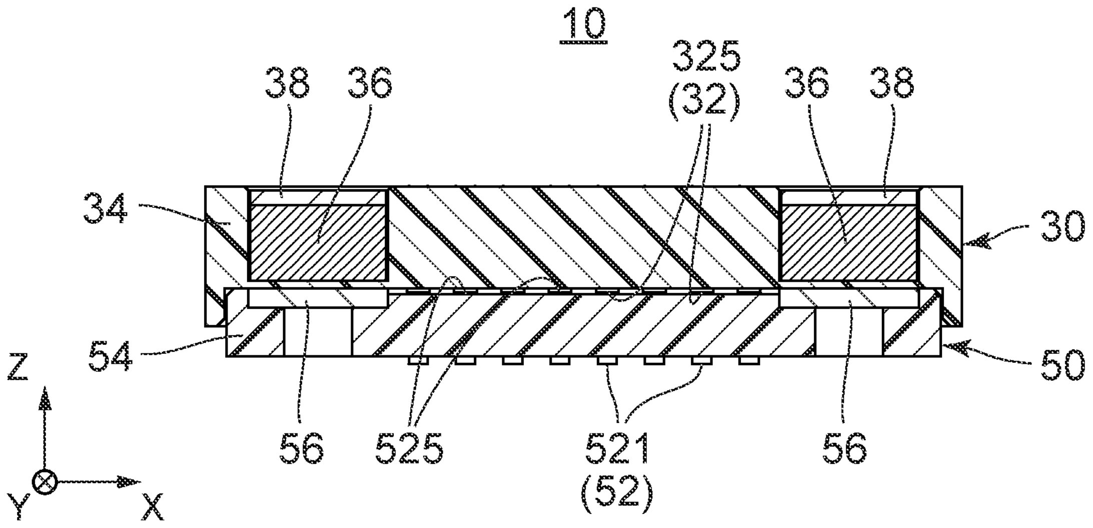
FIG. 8 is a cross-sectional view showing the connector assembly of FIG. 7, taken along line C-C.
Figure 9:
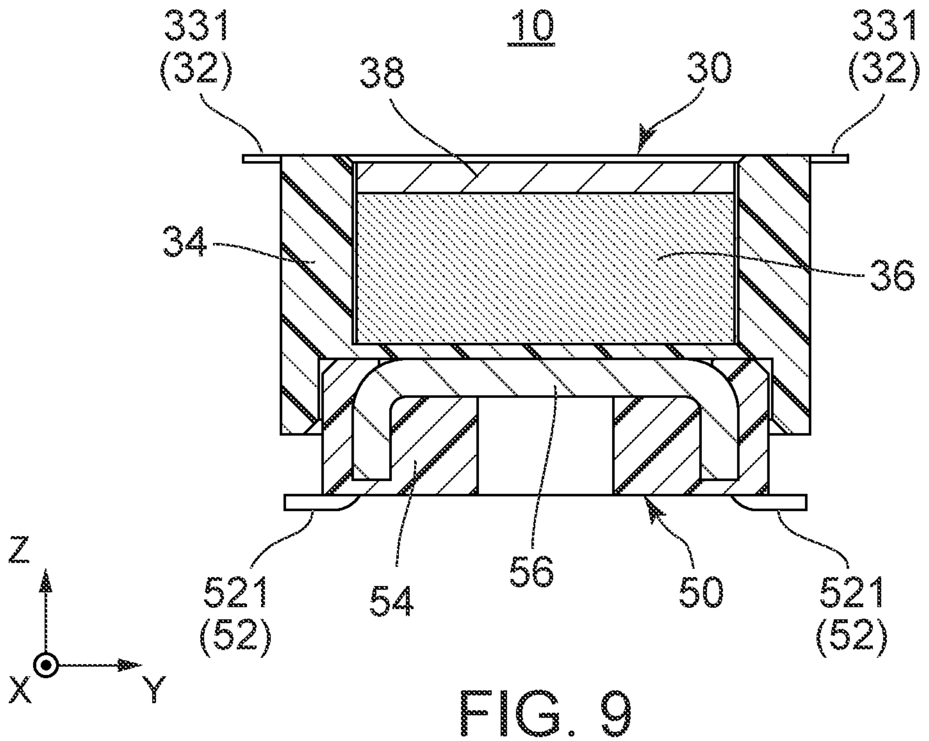
FIG. 9 is a cross-sectional view showing the connector assembly of FIG. 4, taken along line D-D.

Referring to FIGS. 7 to 9, the connector 30 is further provided with a pair of magnets 36 and a pair of yokes 38. The magnets 36 and the yokes 38 are attached to the housing 34. On the other hand, the mating connector 50 is further provided with a pair of magnetic bodies 56. The magnetic bodies 56 are attached to the mating housing 54. In the present embodiment, the connector 30 and the mating connector 50 are connected to each other by means of an attractive force acting between the magnets 36 and the magnetic bodies 56. However, the present invention is not limited thereto. The mating connector 50 may be provided with magnets instead of the magnetic bodies 56. Alternatively, the connector 30 and the mating connector 50 may be connected to each other by another means, such as mating.

As understood from FIGS. 1 and 2, the housing 34 has an outer shape of a roughly rectangular parallelepiped. The housing 34 is long in a front-rear direction perpendicular to the up-down direction and short in a lateral direction perpendicular to both the up-down direction and the front-rear direction. In the present embodiment, the front-rear direction is an X-direction, and the lateral direction is a Y-direction. The housing 34 further has an accommodation portion 341 which receives the mating housing 54 in part. The accommodation portion 341 opens downward. The housing 34 is formed by means of injection molding using insulation resin, for example. However, the present invention is not limited thereto. The shape of the housing 34 is not particularly limited but may be freely designed.

As understood from FIGS. 1 and 2, the mating housing 54 has an outer shape of a roughly rectangular parallelepiped. The mating housing 54 is smaller than the housing 34 in each of the front-rear direction, the lateral direction and the up-down direction. In other words, the mating housing 54 has a size which can be accommodated in the accommodation portion 341 of the housing 34 at least in part. The mating housing 54 is formed by means of injection molding using insulation resin, for example. However, the present invention is not limited thereto. The shape of the mating housing 54 is not particularly limited but may be freely designed. The mating housing 54 should realize connections of the mating terminals 52 to the terminals 32 corresponding to the mating terminals 52.

As shown in FIGS. 1 and 2, the terminals 32 are arranged in two rows and form two terminal rows. The two terminal rows are arranged in the lateral direction. In each of the terminal rows, the terminals 32 are arranged at predetermined intervals. The terminals 32 are held by the housing 34. However, the present invention is not limited thereto. The terminals 32 may be arranged in a single row or three or more rows.

As shown in FIG. 8, the magnets 36 are located on both sides of the terminal rows in the front-rear direction. The yokes 38 correspond to the magnets 36, respectively. As shown in FIGS. 8 and 9, each of the yokes 38 covers an upper surface of the magnet 36 corresponding thereto.

As shown in FIGS. 1 and 2, the mating terminals 52 are arranged so that they correspond to the terminals 32 of the connector 30, respectively. In detail, the mating terminals 52 are arranged in two rows and form two mating terminal rows. The two mating terminal rows are arranged in the lateral direction. In each of the mating terminal rows, the mating terminals 52 are arranged at predetermined intervals. The mating terminals 52 are held by the mating housing 54.

As shown in FIG. 8, the magnetic bodies 56 are located on both sides of the mating terminal rows in the front-rear direction so that they correspond to the magnets 36 of the connector 30, respectively. As shown in FIG. 9, each of the magnetic bodies 56 has an inverted U-shape when viewed along the front-rear direction. However, the present invention is not limited thereto. The magnetic body 56 may have a shape other than the inverted U-shape, such as a flat plate shape.

Figure 5:
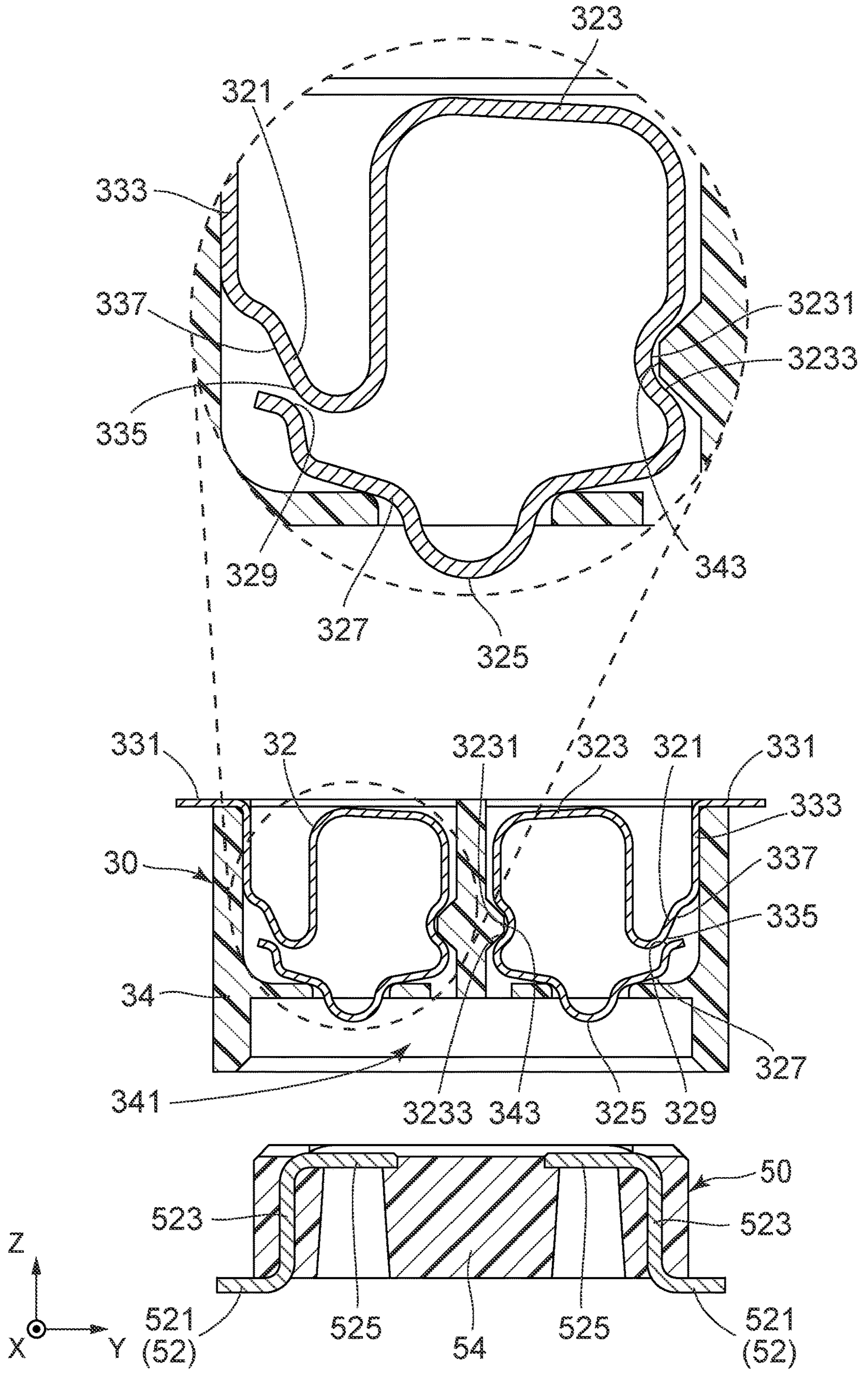
FIG. 5 is a cross-sectional view showing the connector assembly of FIG. 3, taken along line A-A.
Figure 6:
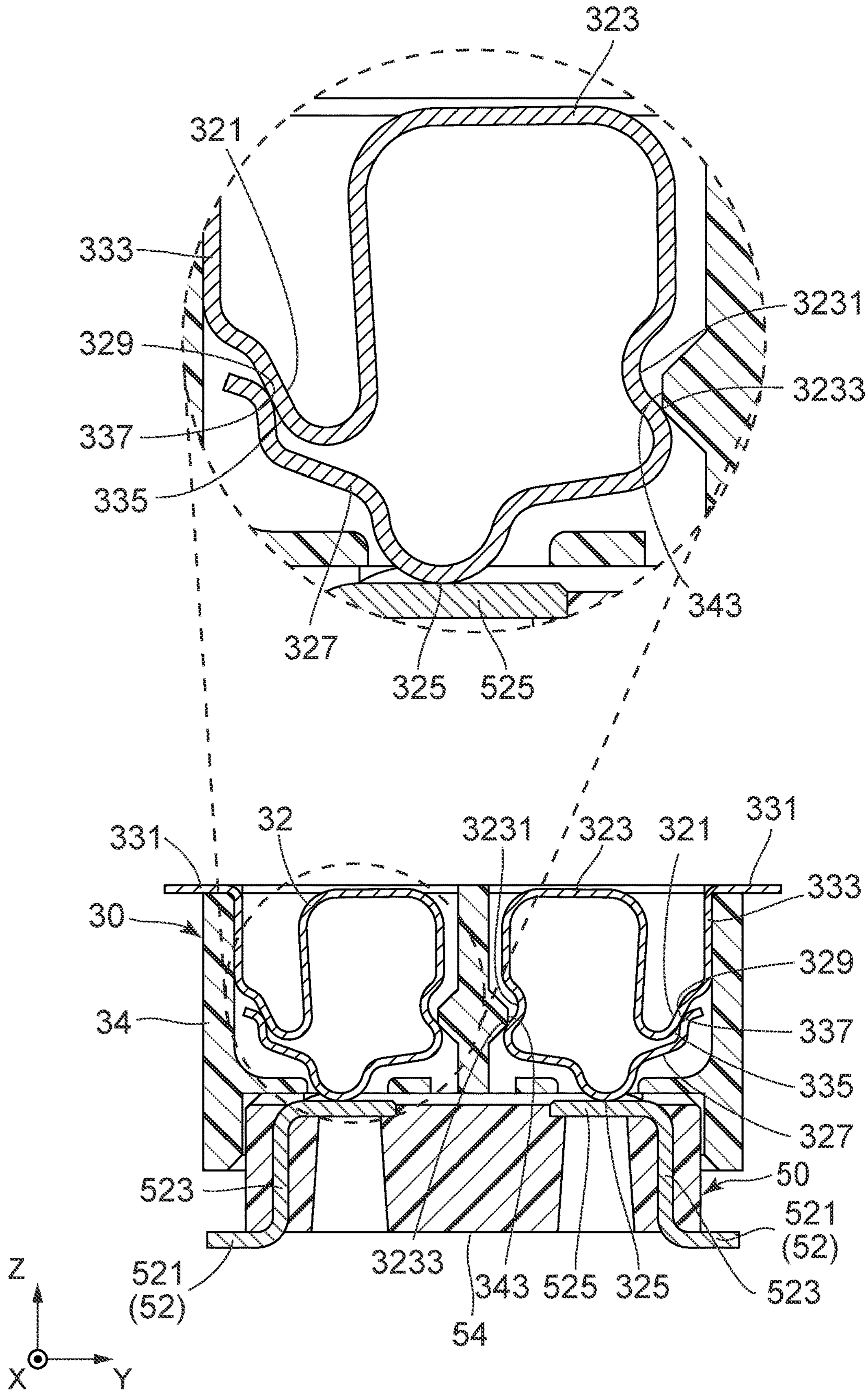
FIG. 6 is a cross-sectional view showing the connector assembly of FIG. 4, taken along line B-B.

Referring to FIGS. 5 and 6, two of the terminals 32 which are adjacent to each other in the lateral direction are arranged in rotation symmetry about an axis extending in the up-down direction. Similarly, two of the mating terminals 52 which are adjacent to each other in the lateral direction are arranged in rotation symmetry about an axis extending in the up-down direction. Moreover, as understood from FIGS. 1 and 2, in the present embodiment, the two terminal rows of the connector 30 are arranged in rotation symmetry about an axis extending in the up-down direction. Similarly, the two mating terminal rows of the mating connector 50 are arranged in rotation symmetry about an axis extending in the up-down direction.

As shown in FIGS. 5 and 6, each of the mating terminals 52 has a fixing portion 521, a holding portion 523 and a mating contact portion 525. The fixing portion 521 extends in the lateral direction. The holding portion 523 extends upward from an end of the fixing portion 521. The mating contact portion 525 extends from an end of the holding portion 523 in the lateral direction. The mating contact portion 525 extends in a direction going away from the fixing portion 521. The mating terminal 52 is formed by punching and bending a sheet metal, for example. The mating terminal 52 is held by the mating housing 54 by means of insert molding, for example.

As shown in FIGS. 5 and 6, each of the terminals 32 has a receiving portion 321, a first supporting portion 323 which is resiliently deformable and extends from the receiving portion 321, a contact portion 325 supported by the first supporting portion 323, a second supporting portion 327 extending from the contact portion 325 and an abutment portion 329 supported by the second supporting portion 327. The terminal 32 further has a fixing portion 331 and a holding portion 333. The terminal 32 is formed by punching and bending a sheet metal, for example. The terminal 32 is held by the housing 34 by means of press-fit, for example.

As shown in FIGS. 5 and 6, the fixing portion 331 of the terminal 32 extends in the lateral direction. The holding portion 333 extends downward in the up-down direction from an end of the fixing portion 331. The receiving portion 321 extends generally diagonally downward from an end of the holding portion 333. In the lateral direction, the receiving portion 321 extends in a direction going away from the fixing portion 331. The first supporting portion 323 extends upward from an end of the receiving portion 321, extends in the lateral direction, extends downward, and further extends diagonally downward. The first supporting portion 323 extends so that it generally draws a rectangular shape. The first supporting portion 323 supports the contact portion 325 at an end thereof. The second supporting portion 327 extends diagonally upward from the contact portion 325. In the lateral direction, the contact portion 325 extends in a direction approaching the fixing portion 331. The second supporting portion 327 supports the abutment portion 329 at an end thereof. The abutment portion 329 faces the receiving portion 321 in each of the up-down direction and the lateral direction.

As understood from FIGS. 5 and 6, the contact portion 325 of the terminal 32 is brought into contact with the mating terminal 52 when the connector 30 is connected to the mating connector 50. In a connection process of the connector 30 and the mating connector 50, the contact portion 325 is slid on or wipes off the mating contact portion 525. On the other hand, in the connection process of the connector 30 and the mating connector 50, the abutment portion 329 begins to be brought into contact with the receiving portion 321 at a first position 335 on the receiving portion 321, and it is slid on the receiving portion 321 until connection of the connector 30 and the mating connector 50 is completed and the abutment portion 329 reaches a second position 337 on the receiving portion 321.

As understood from FIGS. 5 and 6, the second position 337 is located diagonally upward of the first position 335 so that the abutment portion 329 keeps on being in contact with the receiving portion 321 from the first position 335 to the second position 337. In detail, the second position 337 is farther from the contact portion 325 than the first position 335 is in the up-down direction and farther from the first supporting portion 323 than the first position 335 is in the lateral direction perpendicular to the up-down direction. The receiving portion 321 intersects with the up-down direction and the lateral direction at least at the second position 337. In the present embodiment, the receiving portion 321 intersects with the up-down direction and the lateral direction between the first position 335 and the second position 337. The receiving portion 321 intersects with the up-down direction and the lateral direction at least at the second position 337, so that the contact portion 325 keeps on being moved on the mating contact portion 525 in the lateral direction even when the abutment portion 329 is slid on a vicinity of the second position 337.

As shown in FIGS. 5 and 6, in the present embodiment, the receiving portion 321 extends diagonally in a direction going away from the first supporting portion 323. With this structure, the abutment portion 329 can be slid on the receiving portion 321 without acting against spring properties of the first supporting portion 323, and furthermore the contact portion 325 can be appropriately slid on the mating contact portion 525. In the connection process, the abutment portion 329 is slid on the receiving portion 321. Accordingly, a length of a movable part of the second supporting portion 327 is not varied. Therefore, a spring constant of the second supporting portion 327 is not varied, and a contact force of the abutment portion 329 to the receiving portion 321 can be stabilized.

As shown in FIGS. 5 and 6, the connector 30 is further provided with cam portions 343. In the present embodiment, the cam portions 343 are provided to the housing (holding member) 34. The cam portions 343 are not essential. However, by providing the cam portions 343, contact reliability between the connector 30 and the mating connector 50 can be further improved as described later.

As understood from FIGS. 5 and 6, the first supporting portion 323 of the terminal 32 is provided with a cam receiving portion 3233. In the present embodiment, the first supporting portion 323 has an indented portion 3231 indented toward the abutment portion 329 in the lateral direction, and the cam receiving portion 3233 is provided as a part of the indented portion 3231. The indented portion 3231 is not essential. However, since the first supporting portion 323 has the indented portion 3231, a length of the first supporting portion 323 can be longer. With this structure, the spring properties of the first supporting portion 323 can be further improved. In addition, spaces provided in the housing 34 for accommodating the terminals 32 can be effectively used. In other words, without enlarging a size of the connector 30, the spring properties of the first supporting portion 323 can be improved.

As shown in FIGS. 5 and 6, the cam receiving portion 3233 is located between the cam portion 343 and the contact portion 325 in the up-down direction. Moreover, the cam receiving portion 3233 overlaps with the cam portion 343 in the lateral direction. In the present embodiment, the cam portion 343 is located in the indented portion 3231 at least in part in a state before the connector 30 is connected to the mating connector 50. Moreover, the contact portion 325 is located between the cam receiving portion 3233 and the abutment portion 329 in the lateral direction.

As understood from FIGS. 5 and 6, the cam receiving portion 3233 is brought into abutment with the cam portion 343 when the connector 30 is connected to the mating connector 50. This abutment occurs also when the abutment portion 329 is hardly slid on the receiving portion 321 because of large friction between the abutment portion 329 and the receiving portion 321. When the cam receiving portion 3233 is brought into abutment with the cam portion 343, the first supporting portion 323 begins to be deformed in part so that the contact portion 325 is moved in the lateral direction. Accordingly, the contact portion 325 is forcibly moved in the lateral direction. Thus, the contact portion 325 begins to be slid on or wipe off the mating contact portion 525. As a result, the abutment portion 329 begins to be slid on the receiving portion 321. In this manner, the connection of the connector 30 and the mating connector 50 can be realized.

As described above, in the connection process of the connector 30 of the present embodiment and the mating connector 50, the abutment portion 329 of the connector 30 is slid on the receiving portion 321 from the first position 335 to the second position 337. While the abutment portion 329 is slid on the receiving portion 321, the contact portion 325 keeps on being moved in the lateral direction. As just described, the contact portion 325 is slid on the mating contact portion 525. Accordingly, a natural oxide film on the contact portion 325 and a natural oxide film on the mating contact portion 525 can be certainly removed, so that high contact reliability can be obtained between the contact portion 325 and the mating contact portion 525. In particular, the contact portion 325 is moved on the mating contact portion 525 in the lateral direction even when the abutment portion 329 is slid on the receiving portion 321 in the vicinity of the second position 337. In other words, the contact portion 325 is slid on the mating contact portion 525 in a vicinity of a position where the contact portion 325 is finally stopped in a state that the connector 30 and the mating connector 50 are connected to each other. In this way, high connection reliability can be certainly obtained between the contact portion 325 and the mating contact portion 525.

Second Embodiment

Figure 10:
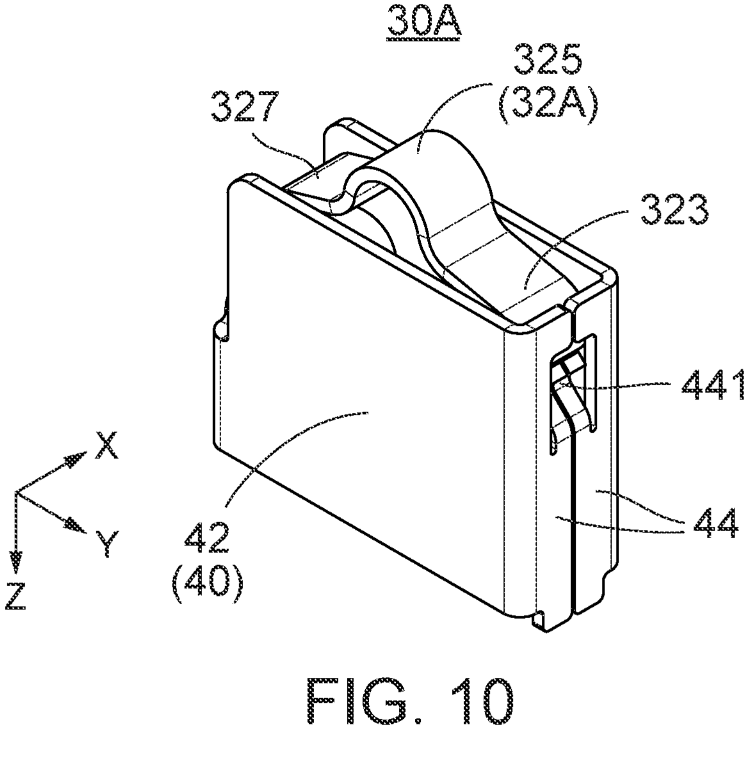
FIG. 10 is a perspective view showing a connector according to a second embodiment of the present invention.

Referring to FIG. 10, a connector 30A according to a second embodiment of the present invention is provided with a terminal portion 32A and a pair of cover portions 40. The terminal portion 32A and the cover portions 40 are integrally formed by using a single sheet metal. Each of the cover portions 40 partly covers the terminal portion 32A.

Figure 12:
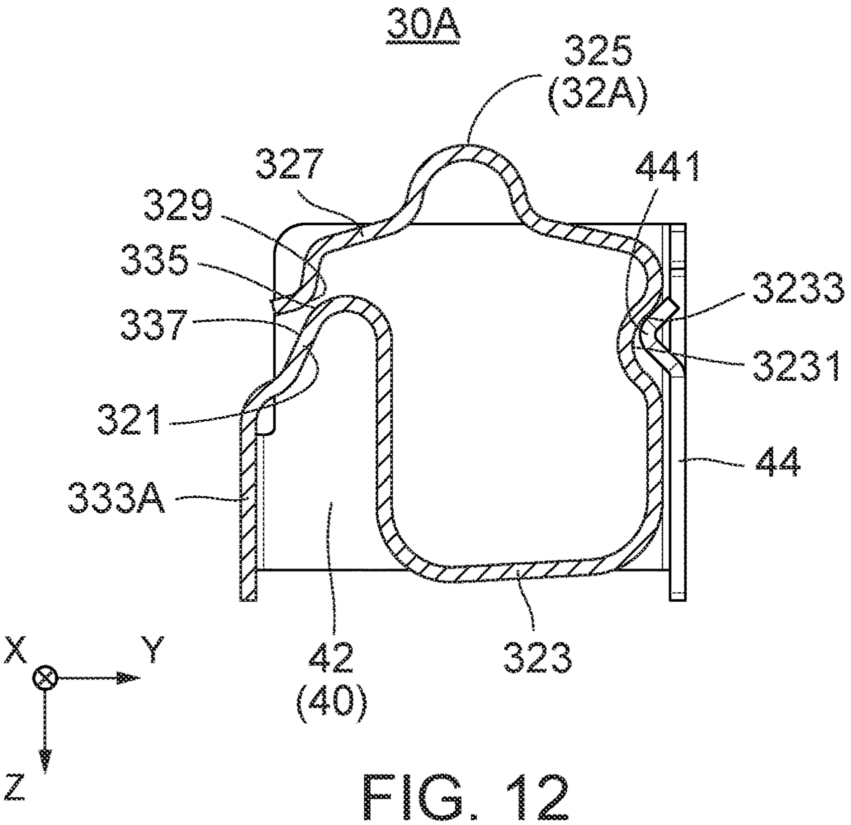
FIG. 12 is a cross-sectional view showing the connector of FIG. 11, taken along line E-E.

As understood from a comparison between FIG. 5 and FIG. 12, the terminal portion 32A of the connector 30A is formed so that it is substantially same as the terminal 32 of the connector 30 except for a point that it does not have the fixing portion 331. Accordingly, the description about the terminal portion 32A will be omitted.

Figure 11:
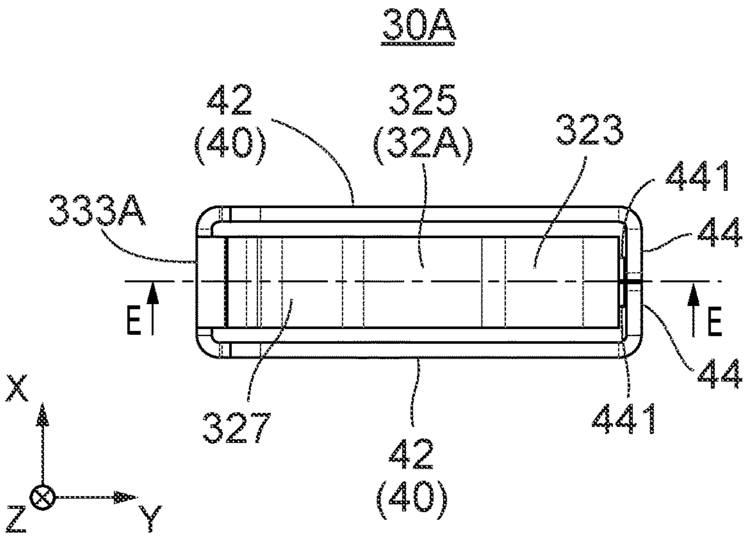
FIG. 11 is a bottom view showing the connector of FIG. 10.

As understood from FIG. 11, each of the cover portions 40 has a primary plate portion 42 and a secondary plate portion 44. The primary plate portion 42 is a flat plate which is perpendicular to the front-rear direction and has a generally rectangular shape. In the lateral direction, a size of the primary plate portion 42 is larger than a size of the terminal portion 32A. In the lateral direction, one of edges of the primary plate portion 42 is coupled to a front plate portion 333A of the terminal portion 32A. Here, the front plate portion 333A of the terminal portion 32A is a part corresponding to the holding portion 333 of the terminal 32 of the first embodiment (see FIG. 5 or 6).

As shown in FIG. 11, the secondary plate portion 44 of each of the cover portions 40 is a flat plate which is perpendicular to the lateral direction and has a generally rectangular shape. The secondary plate portion 44 has a shape which is long in the up-down direction and short in the front-rear direction. The secondary plate portion 44 extends forward or rearward from the other of the edges of the primary plate portion 42 in the lateral direction. In the present embodiment, a positive X-direction is directed forward while a negative X-direction is directed rearward.

As shown in FIG. 10, each of the secondary plate portions 44 is formed with a cam portion 441. The cam portion 441 is formed by cutting, raising and bending a part of the secondary plate portion 44. The cam portion 441 protrudes toward the terminal portion 32A in the lateral direction. The cam portion 441 is not essential. However, by providing the cam portion 441, contact reliability between the connector 30A and a mating connector (not shown) can be further improved.

Figure 13:
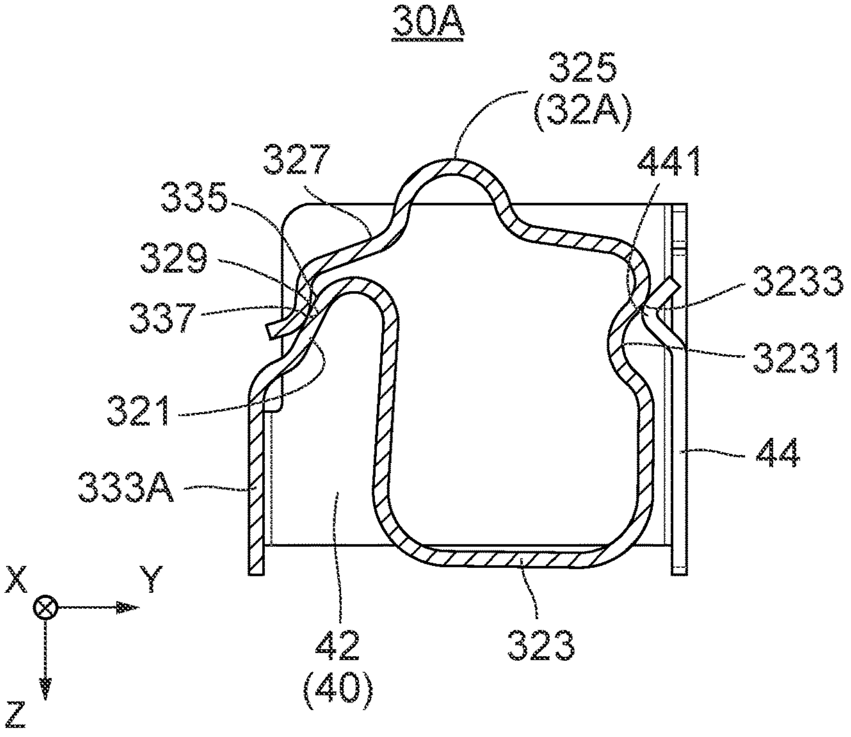
FIG. 13 is another cross-sectional view showing the connector of FIG. 11. The connector is in a state that it is mated with a mating connector.
Figure 14:
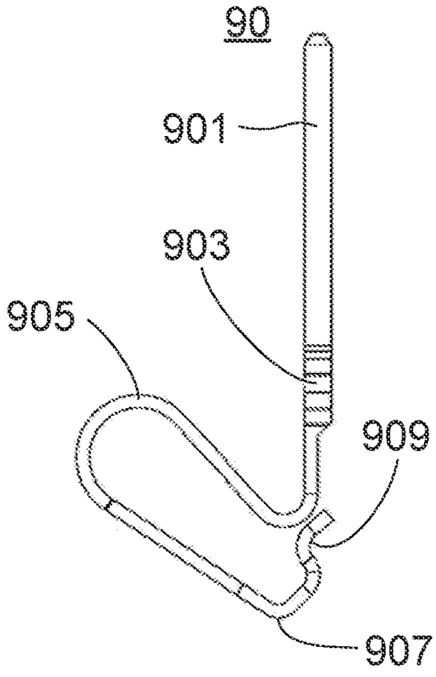
FIG. 14 PRIOR ART
FIG. 14 is a side view showing a terminal included in a connector disclosed in Patent Document 1.
Figure 15:
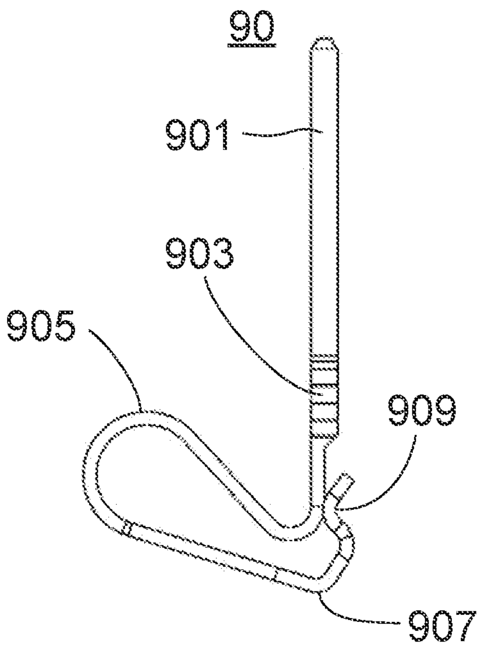
FIG. 15 PRIOR ART
FIG. 15 is another side view showing the terminal of FIG. 14. The terminal is in a state that it is in contact with a pad of a module substrate.

As understood from FIGS. 12 and 13, also in the present embodiment, in a connection process of the connector 30A and the mating connector (not shown), an abutment portion 329 of the connector 30A is slid on a receiving portion 321 from a first position 335 to a second position 337. While the abutment portion 329 is slid on the receiving portion 321, a contact portion 325 keeps on being moved in the lateral direction. Accordingly, a natural oxide film formed on the contact portion 325 and a natural oxide film formed on a mating contact portion (not shown) can be certainly removed, so that high contact reliability can be obtained between the contact portion 325 and the mating contact portion. In particular, the contact portion 325 is moved on the mating contact portion 525 in the lateral direction even when the abutment portion 329 is slid on the receiving portion 321 in a vicinity of the second position 337. In other words, the contact portion 325 is slid on the mating contact portion 525 in a vicinity of a position where the contact portion 325 is finally stopped in a state that the connector 30A and the mating connector are connected to each other. In this way, high connection reliability can be certainly obtained between the contact portion 325 and the mating contact portion. Moreover, the cam portion 441 helps the abutment portion 329 to begin sliding.

Although the specific explanation about the present invention is made above referring to the embodiments, the present invention is not limited thereto but susceptible of various modifications and alternative forms without departing from the spirit of the invention. For example, the shape of the first supporting portion 323 of the terminal 32 is not limited to that of the aforementioned embodiment, but the first supporting portion 323 may extend so that it draws a generally triangle or circle.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is connectable to a mating connector along an up-down direction, wherein:

the connector comprises a terminal;

the mating connector comprises a mating terminal;

the terminal has a receiving portion, a first supporting portion which is resiliently deformable and extends from the receiving portion, a contact portion supported by the first supporting portion, a second supporting portion which extends from the contact portion and an abutment portion supported by the second supporting portion;

the contact portion is brought into contact with the mating terminal when the connector is connected to the mating connector;

in a connection process of the connector and the mating connector, the abutment portion begins to be brought into contact with the receiving portion at a first position on the receiving portion and then is slid on the receiving portion until connection of the connector and the mating connector is completed and the abutment portion reaches a second position on the receiving portion;

the second position is farther from the contact portion than the first position is in the up-down direction and farther from the first supporting portion than the first position is in a lateral direction perpendicular to the up-down direction; and the receiving portion intersects with the up-down direction and the lateral direction at least at the second position.

2. The connector as recited in claim 1, wherein the receiving portion intersects with the up-down direction and the lateral direction between the first position and the second position.

3. The connector as recited in claim 1, wherein:

the connector further comprises a cam portion;

the first supporting portion is provided with a cam receiving portion;

the cam receiving portion is located between the cam portion and the contact portion in the up-down direction;

the cam receiving portion overlaps with the cam portion in the lateral direction;

the contact portion is located between the cam receiving portion and the abutment portion in the lateral direction; and in the connection process of the connector and the mating connector, the cam receiving portion is brought into abutment with the cam portion and thereby the abutment portion of the cam receiving portion on the cam portion deforms the first supporting portion so that the contact portion is forcibly moved in the lateral direction.

4. The connector as recited in claim 3, wherein:

the connector further comprises a holding member which holds the terminal; and the cam portion is provided to the holding member.

5. The connector as recited in claim 3, wherein: the first supporting portion has an indented portion indented toward the abutment portion in the lateral direction;

the cam receiving portion is provided as a part of the indented portion; and in a state before the connector is connected to the mating connector, the cam portion is located in the indented portion at least in part.

* * * * *